United States Patent [19]

Hassenfritz

[11] Patent Number: 4,466,364
[45] Date of Patent: Aug. 21, 1984

[54] PLANTER ATTACHMENT

[76] Inventor: Dave Hassenfritz, R.R. #4, Mt. Pleasant, Iowa 52641

[21] Appl. No.: 378,448

[22] Filed: May 14, 1982

[51] Int. Cl.³ .......................... A01C 5/08; A01B 25/00
[52] U.S. Cl. .......................................... 111/1; 111/7; 111/73; 111/80; 111/87; 172/166; 172/253; 172/462; 172/573
[58] Field of Search ..................... 111/1, 6, 7, 14–16, 111/52, 55, 59, 61, 62, 73, 80, 84, 85, 87, 86; 172/142, 413, 456, 462, 488, 497, 500, 570, 572, 573, 624, 657, 705, 247, 248, 253, 482, 166, 640, 297, 302

[56] References Cited

U.S. PATENT DOCUMENTS

| | | | |
|---|---|---|---|
| 447,763 | 3/1891 | Coombs | 172/142 |
| 1,707,650 | 4/1929 | Youngren et al. | 111/66 X |
| 2,520,345 | 8/1950 | Starr | 172/500 |
| 3,237,577 | 3/1966 | Wilkins | 111/7 |
| 3,292,562 | 12/1966 | Clark | 111/7 |
| 3,314,386 | 4/1967 | Kopaska | 111/52 |
| 3,335,681 | 8/1967 | Main et al. | 111/73 X |
| 3,362,361 | 1/1968 | Morrison | 111/85 X |
| 3,389,754 | 6/1968 | Allison | 111/85 X |
| 3,523,585 | 8/1970 | Godbersen | 172/456 |
| 3,528,507 | 9/1970 | Morkoski | 172/413 |
| 3,635,495 | 1/1972 | Orendorff | 111/85 X |
| 3,673,970 | 7/1972 | Hatcher | 111/85 |
| 3,752,238 | 8/1973 | Chilton | 111/85 X |
| 3,799,079 | 3/1974 | Dietrich | 111/7 |
| 3,811,387 | 5/1974 | Meiners | 111/1 |
| 4,036,304 | 7/1977 | Crow | 111/1 X |
| 4,406,329 | 9/1983 | Schlueter | 172/640 |
| 4,407,371 | 10/1983 | Hohl | 172/253 |

OTHER PUBLICATIONS

Anon. (ad) (1979) "Spike Tooth Preplant" Emmert Mfg. Co. Inc. Audubon, Iowa 50025.
Anon. (ad) (1979) "The Schultz Planter Tiller Saves Time" Schultz Mfg. Co., Waterloo, Iowa, 50704.

Primary Examiner—James R. Feyrer
Attorney, Agent, or Firm—Henderson & Sturm

[57] ABSTRACT

The invention relates to agricultural implements for planting. Increased efficiency of planting in general and incorporating fertilizer in particular in no-till situations is achieved by frame, disk and knife assemblies (14, 15, 16) mounting a disk (44) immediately ahead of a knife (68) and depth-controlled by a spring (63).

1 Claim, 4 Drawing Figures

PLANTER ATTACHMENT

TECHNICAL FIELD

This invention relates generally to agricultural implements. More particularly, this invention relates to an attachment for planters to facilitate usage in no-till or low till situations.

BACKGROUND ART

The environmentalist movement has renewed concern for conservation of the various resources of the earth, one major resource being the excellent farmland of this country. Various methods of soil conservation have been worked out since the "dust-bowl" days such as contouring of fields and the like. More recently, minimum tillage and no-till techniques have been employed on an increasing scale with superior results in soil conservation.

The newer tillage techniques, however, present new problems regarding fertilizing, planting and weed and insect control which present implements do not handle satisfactorily. Most particularly in the no-till situation, present planters, employing generally a double disk arrangement, experience difficulty incorporating fertilizer to the desired depth.

DISCLOSURE OF INVENTION

Responding to the needs described above, this invention provides a planter attachment having a frame assembly fixed to the planter. Each of a plurality of springweighted, single disk assemblies are slidably and rotatably mounted on the frame. A knife and fertilizer assembly is mounted on the frame immediately to the rear of each disk assembly. The attachment is positioned generally ahead of the planter's structures which operate on the seed bed, eg., trash cutting coulters, double-disk openers, seed drills, firming wheels, and the like.

It is an object of this invention to provide an improved attachment for a planter.

It is also an object of this invention to provide an attachment for a planter whereby the planter may operate more effectively in minimum tillage situations generally and particularly in no-till situations.

Another object of this invention is provision of an attachment which facilitates proper incorporation of fertilizer even in no-till situations.

A further object of this invention is provision of an attachment which aids in forming the seed bed while also facilitating fertilizing in no-till situations.

It is an object of this invention to provide an attachment which is relatively inexpensive to fabricate and sturdy of construction, yet readily accessible for maintenance and capable of achieving the aforementioned objects.

These objects and other features and advantages of this planter attachment will become readily apparent upon referring to the following description and the drawings.

BRIEF DESCRIPTION OF THE DRAWINGS

The planter attachment invention is illustrated in the drawings wherein.

BEST MODE FOR CARRYING OUT THE INVENTION

Figure 1:
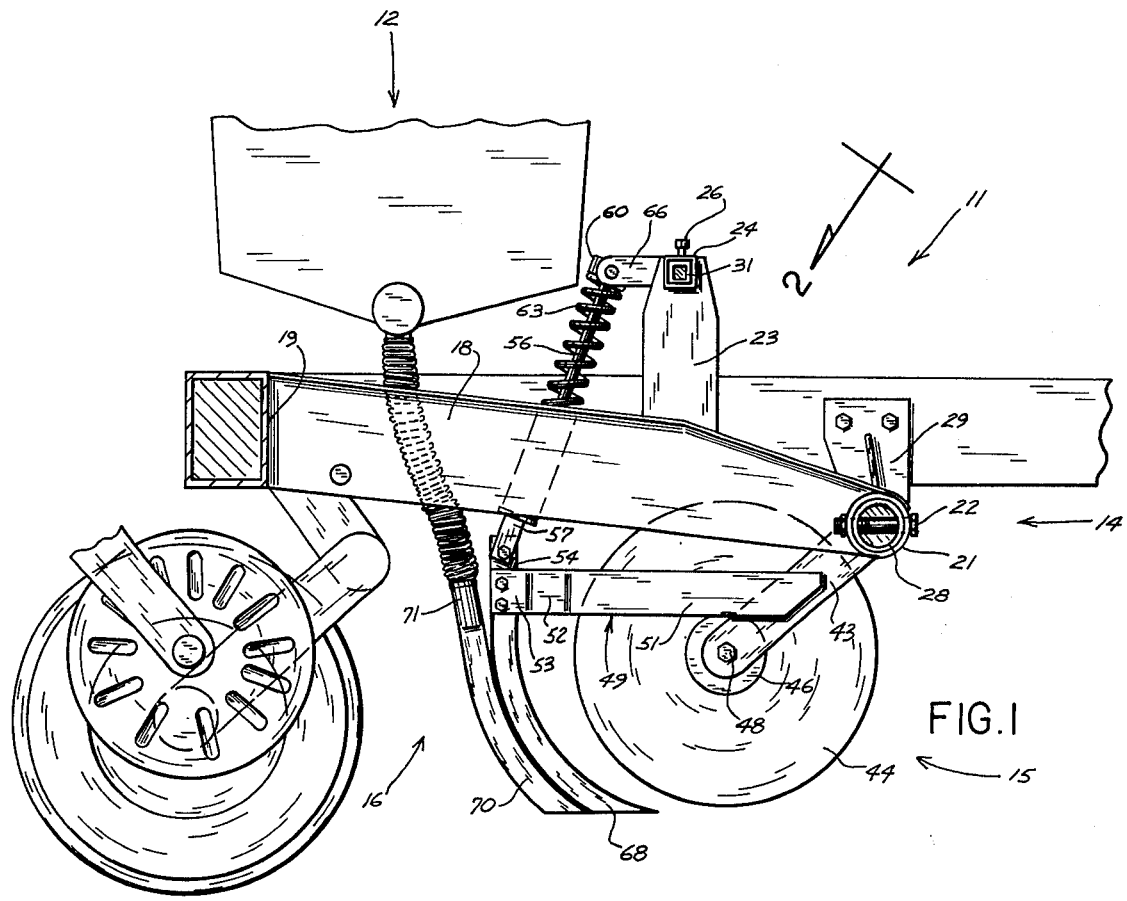
FIG. 1 is a side elevational view showing the attachment joined to the planter, portions of the planter being cut away for greater clarity.

The planter attachment is shown generally at 11 in FIG. 1 fixed to the frame of the planter designated generally as 12. More particularly, the planter attachment 11 includes frame assembly 14, disc assembly 15 and knife assembly 16.

Referring again to FIG. 1, the frame assembly 14 has a pair of side plate members 18. Each member 18, at its upper, rearward end 19, is joined, as by welding, to the main transverse frame member of the planter adjacent the end thereof. The members 18 are parallel, define vertically disposed planes, and extend forward of, and downwardly from, the planter transverse frame member. A bearing sleeve 21 is joined normal to the lower, forward end of each side member 18, and the long axis of the sleeve 21 is horizontal. Aligned pairs of holes for bolts 22 are formed through the sleeves 21, the holes' alignment axes being normal to the sleeves 21 long axes. A member 23 is joined to, and extends generally upward and somewhat forward from, each side member 18. The members 23 are generally intermediate the ends 19 and sleeves 21. A square bearing sleeve 24, having a generally horizontal long axis, is fixed to the upper end of each member 23. A set screw 26 is received through an aperture formed in the top side of each sleeve 24.

Figure 2:
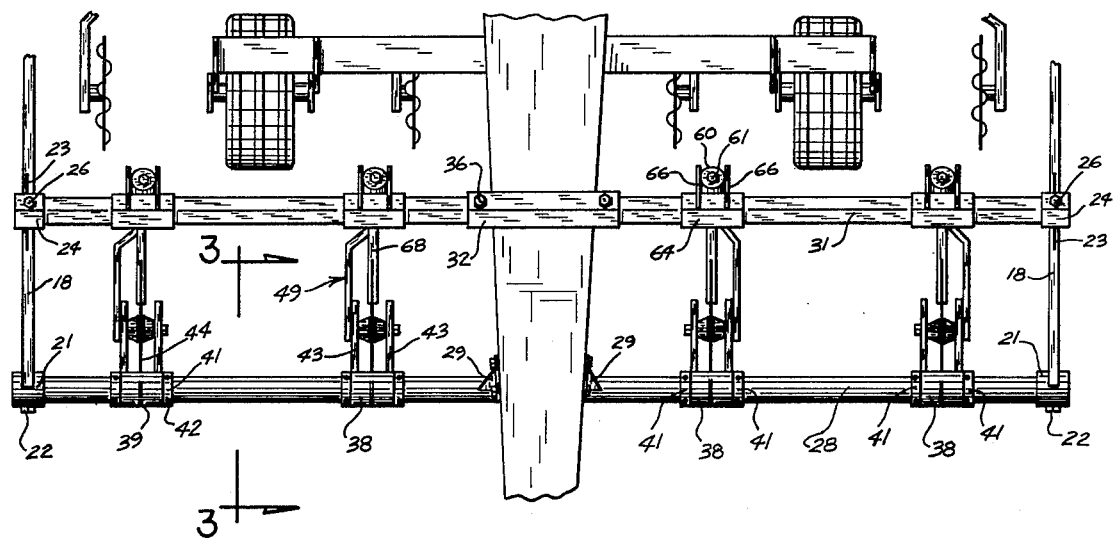
FIG. 2 is a front view, looking down at approximately 45° upon the attachment.
Figure 3:
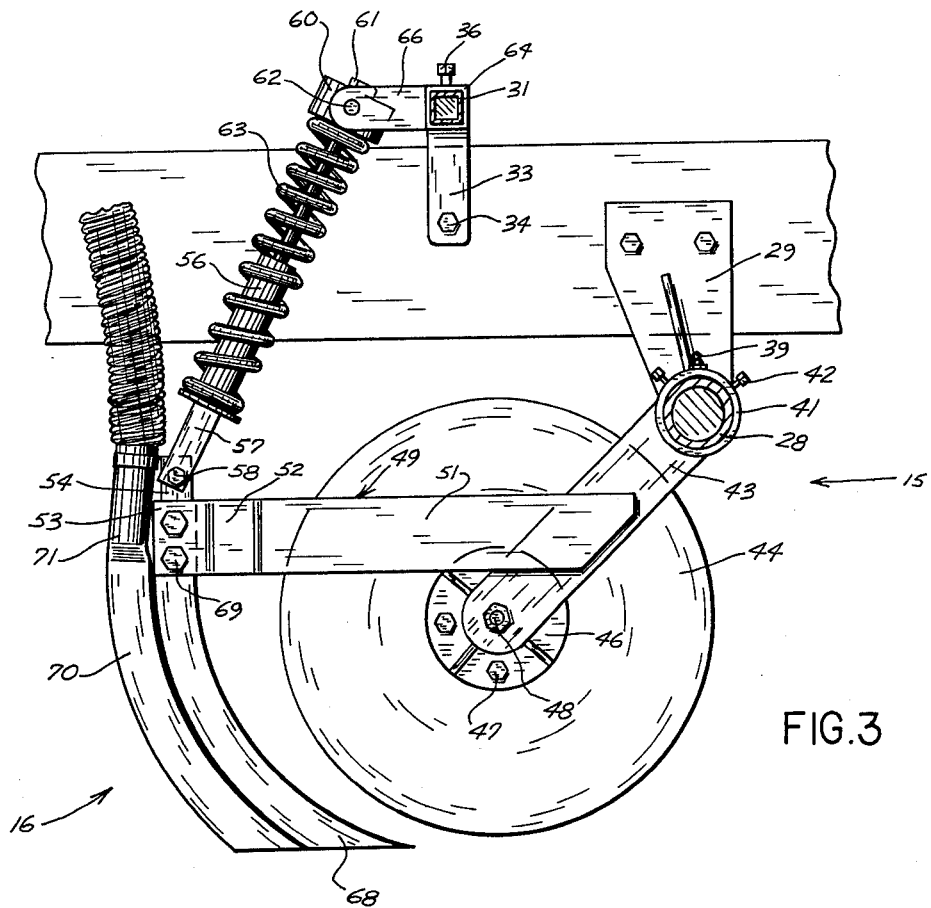
FIG. 3 is an enlarged, fragmentary, sectional view taken along line 3—3 in FIG. 2.

Referring to FIGS. 2 and 3, the frame assembly 14 also includes a lower, front tube 28 having a circular cross section and having aligned holes formed therethrough adjacent each end thereof for receiving bolts 22. The tube 28 passes below the tongue of the planter 12 and is secured by plate and gusset structures extending from the tube 28 and bolted to each side of the tongue. The tube 28 is joined to the side members 18 by sliding the ends thereof into the sleeves 21, aligning the holes formed through the tube 28 with those formed through the sleeves 21, and inserting the attachment bolts 22 through the aligned holes.

Referring again to FIGS. 2 and 3, the frame assembly 14 includes an upper, rear tube 31 square in cross section and having two pairs of aligned holes formed through the top and bottom surfaces thereof, the pairs of holes being disposed on opposite sides of the center of the tube 31 length. A central mounting tube 32 has a pair of depending plates 33 which are affixed to opposite sides of the planter tongue 12 as by bolts 34. Generally vertically aligned holes are formed adjacent each end of mounting tube 32 for receiving bolts 36. The tube 31 is joined to frame 14 by sliding it through mounting tube 32 and sliding the ends thereof into square bearing sleeves 24. The holes formed through tubes 31, 32 are aligned and the bolts 36 passed through the aligned holes, and the set screws 26 are tightened down onto the tube 31.

Figure 4:
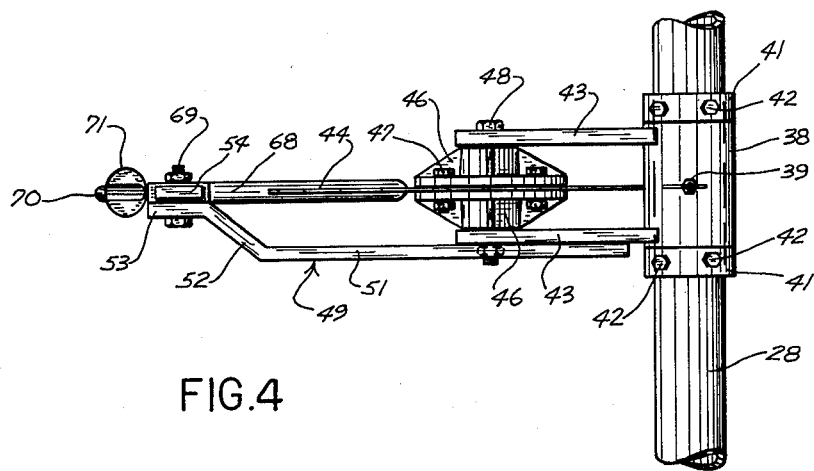
FIG. 4 is an enlarged, fragmentary, sectional view taken along line 4—4 in FIG. 1.

A plurality of disc assemblies 15, FIGS. 2 and 4, are employed. Each includes a mounting sleeve 38 which slides onto, and is rotatable upon, the lower tube 28. A zerk 39 is provided for lubrication. Anchoring sleeves 41 also are slid onto tube 28, a sleeve 41 being disposed on either side of each sleeve 38. The sleeves 41 have set screws 42 which can be tightened down onto the tube 38 to secure the positioning of the sleeves 38, 41. A pair of parallel straps 43 are fixed to each mounting sleeve 38 and extend therefrom to the rear.

Each disk assembly 15 includes a smooth disk 44. Hub bearing members 46 are disposed against opposite sides of the disk 44 and bolted together through the disk 44 as at 47. The disk 44 with hub 46 is positioned between straps 43, and an axle 48 is passed through the disk 44 and hub 46 and detachably mounted to the straps 43.

Each disk assembly 15, FIG. 4, also includes a third strap 49. A straight portion 51 of strap 49 is welded to the strap 43 of assembly 15 which is disposed away from the tongue of planter 12. The strap 49 extends to the rear, the straight portion 51 joining a portion 52 curving toward the disk 44, and the curved portion 52 joining mounting portion 53 disposed behind, and in the plane defined by, disk 44. The mounting portion 53 has knife-mounting holes formed therethrough and also has an upward extension 54 with spring mounting holes formed therethrough.

A telescoping spring guide 56 (FIGS. 2 and 3) has a lower clevis end 57 which fits over extension 54 and is pivotally joined thereto by pin 58. An upper end cap 60 receives the opposite end of guide 56, and a loading nut 61 engages the guide 56 on the top side of cap 60. Cylindrical members 62 project from each side of cap 60 normal to the guide 56 long axis. A compression spring 63 extends between, and bears against, the clevis 57 and the cap 60. A square mounting tube 64 slides onto upper tube 31. Parallel plates 66 are fixed to tube 64 and extend generally upward and to the rear. Aligned holes are formed through plates 66, and the cap members 62 are pivotally received in the aligned holes.

The knife assembly 16, FIG. 3, includes an elongated knife 68 bolted as at 69 to mounting portion 53 and extends downwardly behind the disk 44. An elongated tube 70, having a bent upper end 71, is fitted to the rear edge of knife 68, extends the length of knife 68, and is connected to fertilizer containers mounted on the planter 12.

The components of the planter attachment 11 are formed from materials, and by methods, commonly employed in the farm implement industry.

The individual disk and knife assemblies 15, 16 preferably are mounted upon frame tubes 28, 31 such that they are disposed about 7.6 cm (3 in.) to one side of the seed row axis. In use, the disk 44 is the lead element of the planter, cutting trash away from the path of the knife 68 and aiding in cutting trash away from the adjacent seed bed axis. The knife 68 pulls down into the soil, and fertilizer is deposited behind the knife 68 by tube 70. Fertilizer may be incorporated readily at a depth of up to 15.2 cm (6 in.) in no-till situations. The length of the spring 63 adjusts the depth to which the disk 44 penetrates, and fine adjustment is by modification of the spring 63 tension. Should the disk and knife assemblies 15, 16 strike a rock or other very hard material, the sleeve 38 will rotate about tube 28, thereby allowing the assemblies 15, 16 to travel over the hard object. Thereafter, the spring 63 presses the assemblies 15, 16 back against the ground. Should there be any breakage, the attachment 11 can be disassembled easily for repair.

The industrial applicability of this planter attachment invention is believed to be apparent from the foregoing description. Although a preferred embodiment has been disclosed herein, it is to be remembered that various alternate constructions can be made thereto without departing from the scope of this invention.

I claim:

1. An attachment, for adapting a planter to minimum tillage and no-till situations, comprising:

frame means joined to the planter;

means for cutting trash and incorporating fertilizer mounted at the forward end of the planter by said frame means and including a disc, a knife disposed directly behind said disc, and a spring control means connected to said disc and knife; and strap means extends from said frame means, includes a strap pair, said disc being mounted in said strap pair, and further includes a third strap, said knife being mounted to, and said spring control means being received by, said third strap, and said third strap is joined to said strap pair, has a curved portion, a mounting portion joined to said curved portion, and an extended plate joined to said mounting portion, said knife being attached to said mounting portion, and said spring control means being attached to said plate.

* * * * *